July 14, 1959

C. A. SALISBURY 2,894,283

CLAMPING APPARATUS

Filed May 24, 1956

INVENTOR.
Clifton A. Salisbury
BY

ATTORNEY

United States Patent Office 2,894,283
Patented July 14, 1959

2,894,283
CLAMPING APPARATUS

Clifton A. Salisbury, Tonkawa, Okla., assignor to H. B. Egan Manufacturing Company, Muskogee, Okla., a corporation of Oklahoma Application May 24, 1956, Serial No. 587,115

1 Claim. (Cl. 18—18)

This invention relates to improvements in clamping devices and more particularly, but not by way of limitation, to an improved tire clamp for utilization in the vulcanizing of tubeless tires for trucks and automobiles.

It has been common practice for many years to repair ruptures in tire inner tubes, and the like, by vulcanizing a patch of rubber to the damaged tube to completely cover or close the puncture. Since the trend today is toward the use of tubeless tires in automobiles and trucks, new ways have been developed for vulcanizing the tire itself in the event of a puncture or break therein. Many types of clamps have been designed and constructed for retaining the vulcanizing patch and clamping elements therefor against the tire with sufficient pressure for securing the patch thereto.

One disadvantage of presently available tire clamps of this type is the necessity of providing an especially long shaft member for clearing the sidewalls of the tire in order to extend into the complete depth of the inside of the tire. The extreme length of the shaft member requires a proportionately long threaded shank for raising and lowering the shaft during the positioning of the clamp on the tire. In order to place the clamp on the tire, it is usually necessary to rotate or twist the shaft in one direction to provide for raising thereof a sufficient distance to permit clearance of the sidewalls of the tire between the upper and lower clamping members. The upper and lower clamping elements are then moved into susbtantial alignment with the rupture or portion of the tire to be repaired and the shank must be rotated in an opposite direction to lower the shaft and upper clamp member into contact with the tire. Long threaded shanks have a tendency to wobble during the twisting thereof to secure the tire within the clamp. Thus, it is very difficult to center the upper clamping member directly over the rupture being repaired. The shifting of the clamp member during the lowering of the shaft member usually distorts the rubber of the patch and provides an inefficient vulcanizing process.

The present invention contemplates a clamp member for use in the vulcanizing of tubeless tires wherein any extended length of the rotatable shaft member is substantially reduced. This provides for a greater efficiency in positioning the clamp on the tire with respect to the rupture being repaired. The novel clamp of the invention is provided with a sectional curved body portion which may be broken at the joint thereof to facilitate placement of one of the clamping members within the tire. Upon the placement of one clamping member within the tire, the curved portion may be restored to its normal position whereby the second clamping member will automatically be in alignment with the first mentioned clamping member. A threaded shank is provided for one of the clamping members in order to retain the clamp in position on the tire with sufficient pressure for efficiently vulcanizing the puncture. The threaded shank of the novel clamp, however, is of a minimum length and thus greatly facilitates the aligning of the clamp member with the vulcanizing path. Furthermore, considerable interest is being shown today in electrical vulcanizing which uses upper and lower clamping members wherein one of the clamping members is usually an electric heating element. The upper and lower clamping members of the novel clamping device are interchangeable. Thus, one of the clamping members may be an electrical heating unit and may be applied to either the exterior or the interior of the tire as desired for efficiently vulcanizing the tire, as desired for efficiency in repairing the damaged tire.

It is an important object of this invention to provide an improved tire clamp for utilization in the vulcanizing of tubeless tires which may be readily disposed in a clamping position on the tire with a minimum of threading action of the shank member.

It is another object of this invention to provide a tire clamp for tubeless tires which may be readily disposed on a tire in a manner whereby the upper and lower clamping members are automatically aligned to preclude juggling or wobbling of the clamping member adjacent the vulcanizing path which may damage the tire patch.

It is still another object of this invention to provide a tire clamp for tubeless tires wherein the upper and lower clamping members are interchangeable in order to provide a heating element at either the outside or inside of the tire as required for the most efficient vulcanization thereof.

It is a further obpect of this invention to provide a tire clamp for use in the vulcanization of tubeless tires which is simple and efficient in operation and durable and economical in construction.

Other objects and advantages of the invention will be evident from the following detailed description, read in conjunction with the accompanying drawings, which illustrate my invention.

Figure 1:
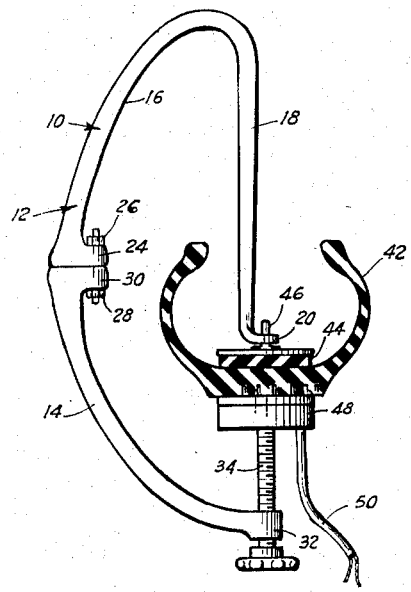
Figure 1 is a side elevational view partly in section of a tire clamp embodying the invention disposed in operable position on a tubeless tire.

Referring to the drawings in detail, reference character 10 generally indicates a novel clamping apparatus comprising an upper arm portion 12 pivotally secured to a lower arm member 14. The upper arm member 12 comprises an arcuately shaped leg portion 16 integral with a substantially straight leg portion 18. The outer extremity of the straight leg portion 18 is provided with an outwardly extending flange member 20 having a centrally disposed aperture 22 therein. The outer extremity of the curved or arcuate leg member 16 is provided with an enlarged apertured flange member 24 adapted to be pivotally secured in any suitable manner, such as bolt members 26 and 28, to a complementary or substantially identical enlarged flange member 30 provided on the lower arm member 14. The arm member 14 is also of an arcuate configuration complementary to the configuration of the leg member 16. The outer extremity of the member 14 is provided with an internally threaded sleeve member 32. A threaded shank member 34 of a relatively short length is disposed within the sleeve member 32 and is provided with a longitudinal bore 36 (Fig. 2) extending downwardly therein.

A detent 38 is provided on the enlarged portion 30 of the lower arm member 14 and is spaced from the pivotal axis at the juncture of the pivotally secured arm members 12 and 14. A spring urged latch member 40, preferably of the ball type shown herein, is disposed on the enlarged portion 24 of the arm 12 and is adapted to cooperate with the detent 38 to retain the arm members 12 and 14 securely in a locked position as shown in Fig. 1 when the clamp member 10 is disposed in an operable position on a tubeless tire 42. The locking action of the latch member 40 may be overcome, however, by manual pressure in opposed directions on the upper and lower members 12 and 14 in order to provide for pivotal movement of the upper member 12 with respect to the lower member 14 as will be hereinafter set forth.

Figure 4:
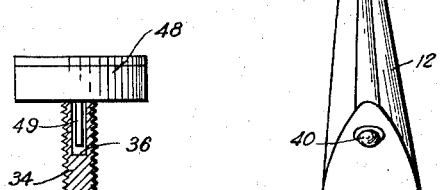
Figure 4 is an enlarged elevational view of a portion of the clamping apparatus with a portion thereof shown in section.
Figure 3:
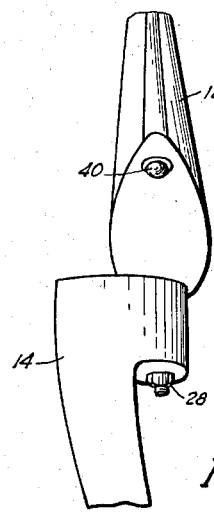
Figure 3 is a perspective view of the pivotal joint member of the clamping arm section.

A clamping member 44 of substantially circular configuration is removably secured to the upper arm member 12 by means of an upwardly extending spindle member 46 extending through the aperture 22 of the flange 20. A second clamping member 48 of substantially the same configuration as the clamping member 44 is similarly removably disposed on the threaded shank 34 by means of a spindle member 49 (Fig. 4) extending into the bore 36. The clamping member 48 is preferably provided with suitable electrical heating elements therein for connection by a suitable electric cord 50 to an outside source of power (not shown). The clamping members 44 and 48 may be interchanged in order that the heating element 48 may be disposed either exteriorly of the tire, as shown in Fig. 1, or interiorly of the tire (not shown).

Figure 2:
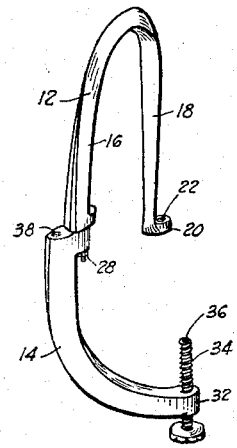
Figure 2 is a perspective view of the novel clamp arm member in an open position for installation on a tire.

Referring to Fig. 1, the clamping members 44 and 48 are removably secured in position on the clamp 10 as hereinbefore set forth so that the member 44 is the upper clamp and the member 48 is the lower clamp. (It will be apparent that the members 44 and 48 may be reversed in position on the clamp 10, if desired, so that the heating clamp 48 is the upper clamp and the clamp 44 is the lower clamp.) Manual pressure may be applied to the arm members 12 and 14 in opposed directions to overcome the locking action of the latch member 40. In this manner, the arm member 12 may be pivoted with respect to the arm member 14, as shown in Fig. 2. The straight arm member 18 may be swung completely out of alignment with the threaded shank member 34 in order to facilitate placing of the arm 12 astraddle of the wall of the tire 42 whereby the upper clamp member 44 is disposed within the tire, as clearly shown in Fig. 1, adjacent the rupture (not shown) to be repaired. When the upper clamp member 44 is in position within the tire 42, the arm member 14 is then manually pivoted toward the normal position with respect to the arm member 12, and the latch 40 will hold the arms 12 and 14 in this position during the vulcanizing operation. When the members 12 and 14 are thus positioned, the lower clamp member 48 is substantially in alignment with the upper clamping member 44. Furthermore, only a minimum of rotation of the threaded shank member 34 is necessary in order to move the clamp member 48 upwardly toward the upper clamp member 44 to provide sufficient pressure on the tire therebetween to assure an efficient vulcanizing thereof. Thus, no hunting or wobbling action of the upper and lower clamp members is necessary in order to press the vulcanizing patch on the tire 42.

The clamp 10 may be easily removed from the tire 42 when the tire has been repaired. Usually one or two turns of the threaded shaft 34 are necessary to back off the lower clamp member 48 out of contact with the tire so that the arm 14 may be pivotally moved with respect to the arm 12 whereby the clamp 48 is moved away from the tire 42. When the clamp 48 has thus been removed from the close proximity of the tire, the upper clamp member 44 may be easily removed from the interior of the tire with no interference from the lower portions of the clamping apparatus 10. It will be apparent that the pivotal action of the sectional clamp body greatly facilitates the installation and removal of the clamp 10 from an operating position on the tire 42.

The present invention provides a novel clamping apparatus for use in the vulcanizing of tubeless tires for automobiles and trucks, or the like, which greatly facilitates the disposition of the upper and lower clamping members of the tire with respect to the tire puncture. A minimum amount of twisting of the threaded shaft member is necessary for securing the clamp on the tire with sufficient force to assure an efficient repairing thereof, thus eliminating the relatively long threaded shank member normally found on clamps of this type. The upper and lower clamping members may be readily interchanged in order that a heating unit may be provided either exteriorly or interiorly of the tire as required for the most efficient patching or repairing thereof. The novel clamping apparatus is of an economical and durable construction and is simple and efficient in operation.

It will be apparent that the novel clamping apparatus of the present invention is not limited to the electrical type of clamping members depicted herein, but may be utilized with other types of clamps. A simple modification of the threaded shank member 34 may be provided to permit the utilization of the spider type clamping members well known in the art, or any heating type of patching or vulcanizing clamp members desired.

Changes may be made in the combination and arrangement of parts as heretofore set forth in the specification and shown in the drawings, it being understood that any modification in the precise embodiment of the invention may be made within the scope of the following claim without departing from the spirit of the invention.

What is claimed is:

A clamping apparatus for tubeless tires, and comprising an arcuate body portion, a laterally pivotal joint provided substantially medial of the arcuate body, locking means for precluding accidental pivoting of the pivotal joint, a substantially straight leg member provided on the body for insertion within the tire and extending past a medial point of the body, a removable clamping member disposed on the leg member for disposal adjacent the interior portion of the tire, an internally threaded sleeve member provided on the body member in substantial alignment with the leg member upon a locked position of the pivotal joint, a shank member threadedly disposed within the sleeve member, a second removable clamping member disposed on the shank member for disposition adjacent the inner portion of the tire, said second clamping member adapted to move simultaneously with the shank member to alternately clamp the tire in the clamping apparatus and release the tire therefrom, one of said clamping members being a heating unit, and said clamping members interchangeable to position the heating clamp member on either the interior or exterior of the tire.

References Cited in the file of this patent

UNITED STATES PATENTS

| | | |
|---|---|---|
| 666,752 | Gustaveson | Jan. 29, 1901 |
| 1,339,151 | Andrus | May 4, 1920 |
| 2,219,419 | Jacobus | Oct. 29, 1940 |
| 2,290,106 | Longstreet | July 14, 1942 |
| 2,292,485 | Slatkin | Aug. 11, 1942 |
| 2,296,162 | Hanson et al. | Sept. 15, 1942 |
| 2,404,989 | Schmid et al. | July 30, 1946 |
| 2,503,411 | Van Scoyk | Nov. 21, 1950 |

FOREIGN PATENTS

| | | |
|---|---|---|
| 4,313 | Great Britain | of 1914 |

OTHER REFERENCES

India Rubber World, page 78, Mar. 1, 1928.